United States Patent [19]
Bork

[11] 3,991,690
[45] Nov. 16, 1976

[54] ANTI-POLLUTION ATTACHMENT TO FURNACE

[76] Inventor: Frank Bork, 1460 W. Victoria, Chicago, Ill. 60611

[22] Filed: Apr. 4, 1975

[21] Appl. No.: 565,054

Related U.S. Application Data

[63] Continuation-in-part of Ser. No. 384,233, July 31, 1973, abandoned.

[52] U.S. Cl. ............................ 110/119; 55/DIG. 30; 55/267; 261/DIG. 9
[51] Int. Cl.² .......................................... F23J 15/00
[58] Field of Search ................ 55/DIG. 30, 80, 220, 55/267–269; 261/DIG. 9, 16, 17; 110/119

[56] References Cited
UNITED STATES PATENTS

| 517,297 | 3/1894 | Reiss | 261/17 |
|---|---|---|---|
| 614,360 | 11/1898 | Bartlett et al. | 55/80 |
| 626,569 | 6/1899 | Sergeant | 55/261 |
| 1,162,325 | 11/1915 | Wilder | 261/17 |
| 2,702,605 | 2/1955 | Kneass, Jr. | 55/261 |
| 3,637,192 | 1/1972 | Giconi | 55/261 |

FOREIGN PATENTS OR APPLICATIONS

| 157,810 | 1/1921 | United Kingdom | 55/267 |

*Primary Examiner*—Bernard Nozick
*Attorney, Agent, or Firm*—Hill, Gross, Simpson, Van Santen, Steadman, Chiara & Simpson

[57] ABSTRACT

Apparatus for attachment to a flue includes a series of chambers for receiving hot products of combustion in the form of gases, cooling the gases and removing noxious impurities through condensation. A blower unit is connected to the series of chambers to add fresh air to the gas flow, hold hot gases down, create a draft from the conventional flue through the system and exhaust a flow of clean air from the system.

8 Claims, 4 Drawing Figures

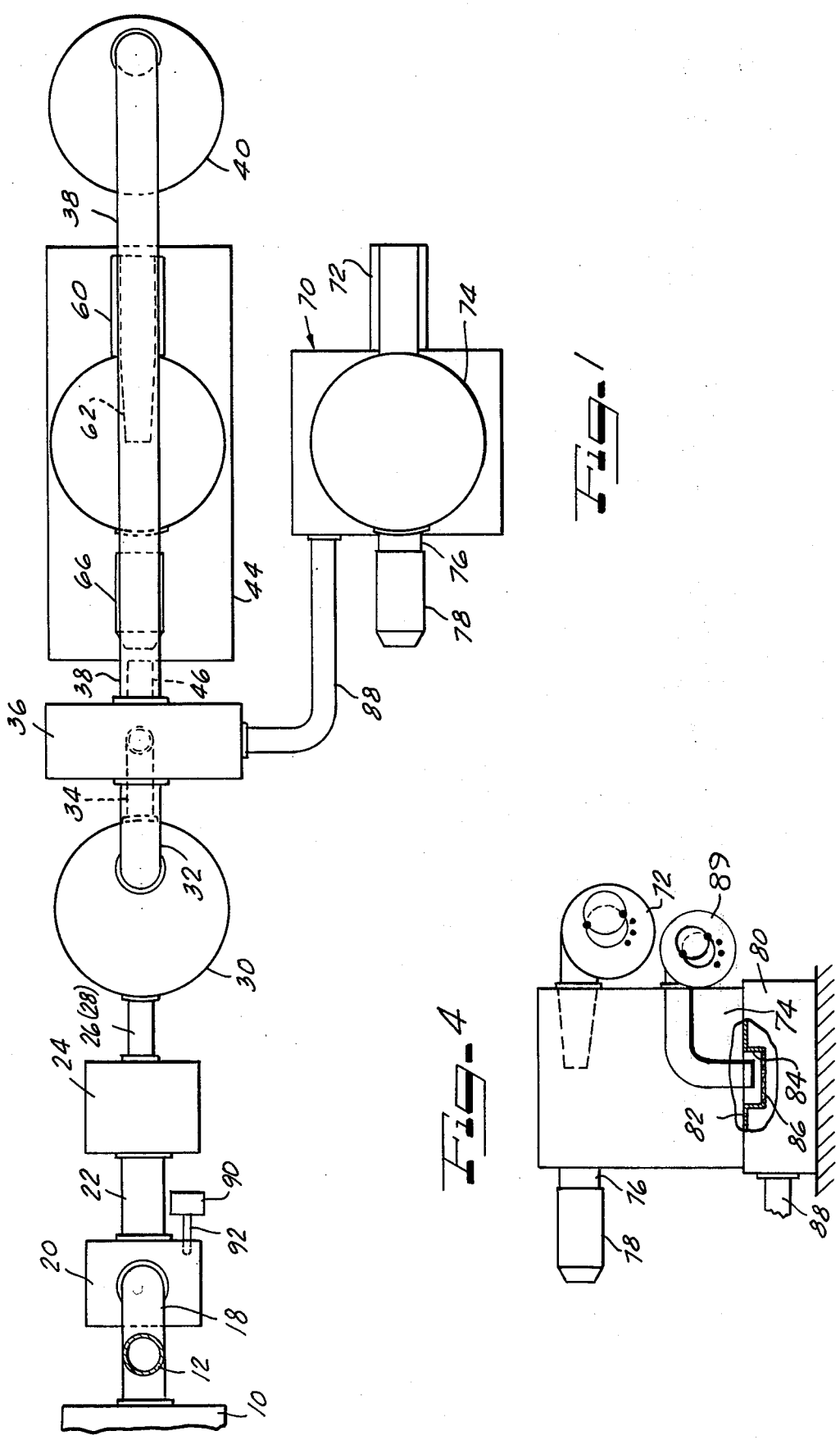

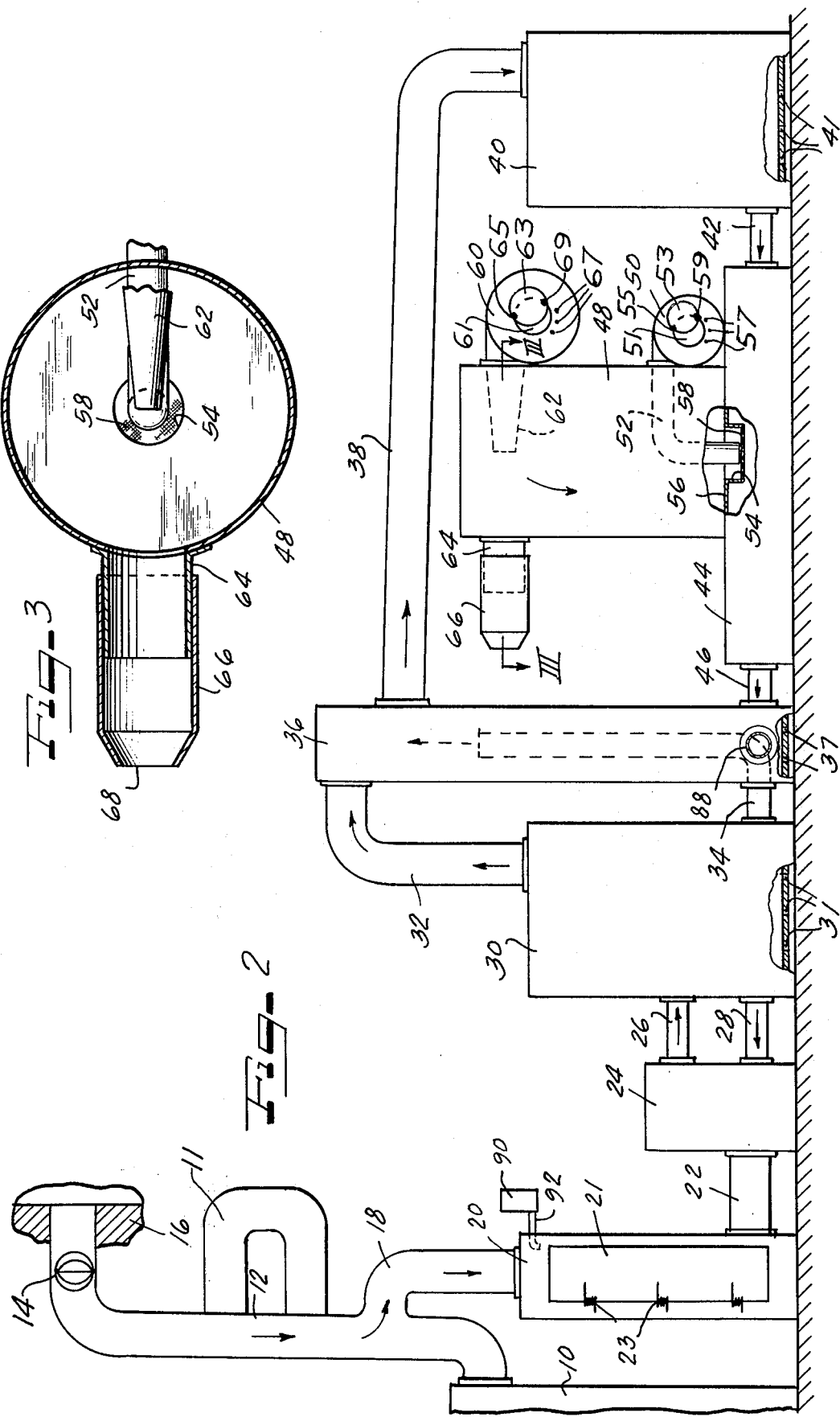

3,991,690

ANTI-POLLUTION ATTACHMENT TO FURNACE

CROSS REFERENCE TO RELATED APPLICATION

This application is a continuation-in-part of my application of the same title, Ser. No. 384,233, filed July 31, 1973 now abandoned.

DESCRIPTION

This invention relates to arrangements for handling gaseous products of combustion from a heating unit such as a boiler or furnace, and more particularly to an arrangement for removing smoke, gases and corrosive particles from combustion gases.

It is a primary object of the invention to provide a novel apparatus for attachment to furnaces, boilers or the like to substantially eliminate smoke and noxious gases and increase the efficiency of the furnace.

A more particular object of the invention is to remove sulphur gas in liquid form from the combustion gases of a burner.

Another object of the invention is to effect a savings of fuel and increase burning of hydrocarbons which cannot be burned in an ordinary oil burner.

According to the invention, a flow of combustion gases is effected through a series circuit which includes a plurality of chambers defined by rectangular and cylindrical hollow structures, hereinafter simply called "boxes". The gases are cooled in the series circuit and condensed, particularly the sulphur gases, to entrap and remove almost all of the suspended solid particles in the gases. Fresh air is injected by a blower unit so as to cause a particular direction of flow and aid in increasing the temperature in the associated burner, by blocking the heated gases from flowing direcly out of a chimney via a conventional flue.

The foregoing and other objects, features and advantages of the invention will be best understood from the following description of preferred embodiments of the invention taken in conjunction with the accompanying drawings, on which:

FIG. 1 is a top view of the apparatus constructed in accordance with the principles of the present invention;

FIG. 2 is a side elevation of the apparatus illustrated in FIG. 1;

FIG. 3 is a sectional view taken generally along the line III—III of FIG. 2; and FIG. 4 is an elevational view of an auxiliary blower unit as shown in FIG. 1.

Referring to the drawings, a furnace, boiler or the like is generally indicated at 10 as being connected to a chimney 16 by way of a conventional flue 12. A vent 14 is held open at all times to allow a flow of cold air to choke off the gases from the furnace 10 and direct the same by way of a conduit 18 to a first box 20 which has a door 21 held closed by, for example, spring hinges 23. A conduit 11 (5 feet × 1 foot × 5 feet) aids in the cold air input and choking process. The damper or vent 14 is preferably 6 feet from the furnace 10 in the particular system tested and specified below. The door 21 is provided for access aid in cleaning the system. All other boxes may also be provided with such a door, but such structure has not been illustrated for any of the other components of the system. Inasmuch as cold air is choking off a gas flow above the conduit 18 and as hot gases tend to rise, the box 20 provides for holding the heat and effecting an increase in temperature in the furnace or burner 10. Consequently, an increase in the efficiency of combustion and a saving of fuel is provided.

The box 20 is connected to a box 24 by way of a conduit 22 located near the lower end thereof (and by way of an additional series box in larger capacity systems). Due to gas flow, which will be better understood from the following description, gases are directed through the conduit 22 into the second hollow box 24. The hollow box 24 is connected to a third hollow box 30 by way of a pair of conduits 26 and 28 through which the gases circulate and tend to be cooled. The cooling of the gases in the box 24 and in the conduits is not, however, sufficient to cause sufficient condensation to remove all of the impurities.

The gases tend to rise in the box 30 and pass by way of a conduit 32 into the upper part of a fourth box 36 and by way of a smaller and lower conduit into the upper part of the box 36, the conduit 34 extending into and upwardly within the box 36. The lighter gases will flow into the box 36 by way of the conduit 32 and somewhat cooler gases by way of the conduit 34. Sufficient cooling for some condensation of gases occurs within the box 30 and the resulting condensate is permitted to flow out of the box 30 through holes provided in the bottom thereof and generally indicated by the reference 31. Condensation also occurs in the box 36 and the resulting condensate is permitted to flow out through holes 37 in the bottom thereof. This is not a high volume of liquid which would require a drainage system connection for run-off and may be collected in any suitable manner.

The hot gases accumulated near the top of the box 36 are caused to flow by way of a conduit 38 to a fifth box 40 wherein further condensation occurs, the resulting liquid condensate flowing out of holes 41 in the bottom of the box 40.

Gases are caused to exit the box 40 and pass to another box 44 by way of a conduit 42 and on again to the bottom of the third box by way of a conduit 46.

The flow of gases through the circuit is effected by means of a blower unit mounted on top of the box 44. The blower unit comprises a box 48 having a blower 50 mounted thereon with an output conduit 52 directed through the central portion of a hole in the top 56 of the box 44, the hole being defined by a downwardly extending flange 54 and being covered by a screen 58 of suitable filter material. The blower 50 injects fresh air into the system causing the flow of gases about the loop. The blower 50 includes an adjustable air intake 51 including a cover 53 which is pivoted at 55 and secured at points 57 by a removable screw 59.

A second adjustable blower 60 is mounted near the top of the box 48 and has a tapered output conduit which reaches into the middle of the box 48. Of the 100% air input, the blower 60 pushes in 30% fresh air into the unit and effects a 70% pull of air out through the screen 58 and out of an outlet 64 directly across from the blower 60. The blower 60 is also adjustable at its intake 61 by means of a cover 63 which is pivoted at 65 and selectively secured at points 67 by a screw 69. The outlet 64 has an adjustable telescopically related sleeve for adjusting the draft from the flue. The 30% push and 70% pull, in conjunction with the air injection of the blower 50, creates a pressure in the unit to hold gases down near the bottom of the box 44 and draw cleansed air out of the outlet 64. The sulphur gas, for example, in liquid form will deposit as a condensate and flow out of the bottom of the boxes as previously mentioned. The outlet 64 should be vented to the outside when the apparatus is used indoors, although tests indicate that external venting is not necessary.

An additional blower unit, similar to the aforedescribed blower unit, may be provided, as indicated at 70, and connected to the tall condensing chamber 36 by way of a conduit 88. The blower unit 70 also has an adjustable blower 72 feeding into a chamber 74 which has an adjustable outlet 76, 78. The chamber or box 74 is mounted on the top wall 82 of a box 80, which also has a central opening defined by a flange 84 and covered by a screen 86, and fed by a blower 89.

Referring to FIG. 2, a water reservoir 90 may be connected by way of a line 92 into the box 20 for metering a small amount of water into the box 20 to enhance condensation in the system.

As an example of sizes of blowers, boxes and conduits for a small oil burner type furnace the following tabulation illustrates an advantageous system:

| Reference Character | Size |
| --- | --- |
| 20 | 11" × 15" × 35" |
| 30, 40, 48 | 23" dia. × 35" |
| 36 | 10" × 25" × 63" |
| 44 | 53" × 24" × 9" |
| 22, 32, 38 | 6" dia. |
| 26, 28, 34, 42, 46 | 3" dia. |
| 60, 72 | ½ h.p., approx. 90–100 cfm |
| 50, 89 | ⅛ h.p., approx. 32 cfm |

Although I have described my invention by reference to a particular illustrative embodiment thereof, many changes and modifications of the invention may become apparent to those skilled in the art without departing from the spirit and acope of the invention. I therefore intend to include within the patent warranted hereon all such changes and modifications as may reasonably and properly be included within the scope of my contribution to the art.

I claim:

1. Non-scrubbing conservation apparatus for use in combination with a furnace having a flue connected in fluid communication with the atmosphere, comprising:
    a first box connected in fluid communication with said flue; and
    condenser means connected in fluid communication with said first box for drawing flue gases into said first box and creating a temperature increase in the furnace, including a second box connected in fluid communication with said first box and a blower unit connected in fluid communication with said second box, the gases drawn into said second box being cooled and condensed, said second box including a bottom wall having holes therein to permit passage of the condensate, and first means defining a first chamber having a pair of inlets and a pair of outlets, one of said outlets disposed across from one of said inlets, a blower mounted in said one inlet and pushing cold air into said first chamber, said one outlet discharging cold air from said first chamber, a second blower extending into said first chamber through the other of said inlets and directed to blow through the other of said outlets, second means defining a second chamber having a first inlet connected to said other outlet of said first chamber, a third box, and means connecting said second means in fluid communication with said second and third boxes via said second means, said third box receiving and condensing gases.

2. The apparatus of claim 1, wherein said condenser means comprises a third box connected in fluid communication with said second box and said blower unit for accumulating and condensing gases.

3. The apparatus of claim 2, wherein said condenser means comprises a fourth box connected in fluid communication with said third box and said blower unit for receiving and condensing gases.

4. Non-scrubbing conservation apparatus in combination with a furnace having a flue connected in fluid communication with the atmosphere, said apparatus comprising:
    a first box connected in fluid communication with said flue for receiving hot flue gases from the furnace and causing an increase in temperature and combustion in the furance;
    a second box connected in fluid communication with said first box for receiving and condensing flue gases;
    a third box connected in fluid communication with said second box for receiving and condensing flue gases;
    a fourth box connected in fluid communication with said third box for receiving and condensing flue gases;
    a fifth box connected in fluid communication with said third and fourth boxes; and
    a blower unit connected in fluid communication with said fifth box for effecting a flow of flue gases to said boxes,
    said second, third and fourth boxes including respective bottom walls having holes therein for run off of condensate, said blower unit comprising means defining a chamber having an input for receiving fresh air, a blower connected to said input for blowing fresh air into said chamber, a second blower for blowing fresh air, and input/output connection between said chamber and said fifth box, said fifth box receiving fresh air from said second blower through the center of said input/output connection, and an output to the atmosphere across from said input, said blowers effecting a greater flow of air through said output than through said input so that cleansed air is drawn from said fifth box into said chamber via said input/output connection and exhausted through said output.

5. Apparatus according to claim 4, comprising means connecting said first and second boxes and providing a circulating path therebetween.

6. The apparatus according to claim 4, comprising a second blower unit connected in fluid communication with said third box for increasing the flow of gases.

7. The apparatus according to claim 4, comprising means for adding moisture into said first box to increase condensation in said second, third and fourth boxes.

8. The apparatus according to claim 4, wherein said first blower pushes 30% cold air into said chamber and said output pulls out 70% of cold air from said chamber.

* * * * *